Patented July 27, 1926.

1,593,899

UNITED STATES PATENT OFFICE.

HILLHOUSE BUEL, OF NEW YORK, N. Y.

BULGARIAN MILK.

No Drawing.   Application filed April 30, 1920.   Serial No. 377,848.

Many unsuccessful attempts have been made prior to my invention to produce a Bulgarian milk at a low cost and at the same time secure a uniform quality having characteristics which appeal to the American public. The public has been educated in some degree as to the health-giving qualities of such milk.

Extensive attempts have been made to manufacture Bulgarian milk by various methods and apparatus adapted to produce it at a sufficiently low price and proper consistency and flavor that would develop a large demand, but all such attempts, prior to my invention, have failed.

One of the principal causes of failure of such prior attempts has been the separation of the curds and whey, sometimes referred to as "splitting." When this occurs it substantially prevents the sale of the milk.

It is accordingly the principal object of my invention to provide a process for making Bulgarian milk which is capable of manufacturing such milk at a relatively low price and which will insure a substantial absence of "splitting."

There has also been difficulty, prior to my invention, of producing a flavor and consistency from Bulgarian fermentations of milk which would make a palatable and popular drink for the American public.

The second object of my invention is to provide a process for making Bulgarian milk which will overcome these difficulties as to flavor and consistency.

The novel features of my invention are pointed out with particularity in the appended claims. The invention itself, however, with further objects and advantages will best be understood by reference to the following description.

My researches in the art of making Bulgarian milk have led me to the conclusion that when milk is fermented with cultures of *Bacillus lacticus Bulgaricus*, the probability of splitting and also the development of unpalatable qualities, such as saponification, is increased both by increase of acidity and increase of agitation, agitation at the time of high acidity being particularly undesirable.

According to my invention I therefore limit the percentage of lactic acid finally developed in the milk to not more than 1.05%, the total amount being preferably less than 1.00% if made in an open vat apparatus, and avoid unnecessary agitation of the milk, especially after the Bulgarian fermentation has begun. I preferably ferment the milk with a culture of *Bacillus lacticus Bulgaricus* and a bacillus of the *Para lacticus* or *Streptococci lacticus* group, the latter chosen for their effect in retarding the saponifying action of the Bulgaricus. I also prefer to separate the cream from the remainder of the milk and inoculate and treat the two separately, thereafter remixing them. In this way I am able to limit the amount of fermentation and acidity to which the cream is subjected to less than that developed in the skim milk until close to the time for bottling and avoid the direct action of *Bacillus lacticus Bulgaricus* on the butter fat, with the consequent danger of developing unpleasant tastes. I prefer to ferment the cream with a culture of *Bacillus para lacticus*, *Bacillus streptococci lacticus* or *Bacillus diplococci lacticus* selected for its flavor producing qualities, and one which preferably requires higher temperatures to make them active than some types of the lactic acid group.

However, Bulgarian milk according to my invention may be made and used in the de-creamed form and I do not limit myself to a finished product with cream or to fermenting the milk in a de-creamed condition. However, the process is more readily controlled and hence the product is more uniform if the milk is de-creamed before fermentation. I have found, moreover, that the butter fat may combine with the acid to thicken the product to an objectionable degree, even when there is no soponification or breaking down of the butter fat and for this reason I limit the percentage of butter fat in the final product to not more than 1.5 per cent. I have found, however, that an increase in the butter fat content apparently masks the acidity as indicated by the taste.

To facilitate the practice of my invention, I will now set forth in detail how I have practiced my invention according to three distinct, though related, adaptations thereof.

A cycle of operations for the first adaptation of process may be described as follows:

Milk is run through a separator, the skimmed milk being conducted to a processing vat (which in this case was a 300 gallon cherry ripener equipped with hot and cold water jacket and an agitator connected with a circulating brine or refrigeration system geared to two speeds), 2⅔ gallons of 33⅓% cream to every 93⅔ gallons of skimmed milk, sufficient to make the mix 1% butter fat content, being conducted to a small processing can to be separately processed. At 11:30 a. m., temperature 52° F., the agitator was started and live steam admitted to the water jacket until the temperature of the milk and cream reached 198° F. at 11:49, with temperature falling to 188° F., when cold water was admitted to the jacket. At 12:15 p. m., with the skimmed fluid at 102° F. and the cream at 75° F., four gallons of *Bacillus Bulgaricus* was added to every 93⅔ gallons of the skimmed fluid and about one pint of the pure *Para lacticus* culture added to every 2⅔ gallons of the cream. When the skimmed fluid sampled .87% acidity and cream sampled .5%, the cream was added to skimmed fluid, the agitator started on high speed, and brine admitted. When temperature reached 58° F. agitation was checked and brine turned off. Milk was bottled under a head of 14 feet and placed at once in refrigeration box at a temperature of 36° F. Milk held in box for 12 hours at this temperature to cure and cool next day sampled .94% acidity. Instead of inoculating with a pure culture of *Bacillus Bulgaricus*, I may use an inoculating culture having 25% *Para lacticus*, or other approved lactic type, associated with *Bacillus Bulgaricus*, in which case the fermenting temperature should range between 97° F. and 87° F., preferably 90° and 92° F.

A cycle of operations of second adaptation of process may be described as follows:

A 300 gallon cherry ripener was used, the milk having a 1% content of butter fat. Sterilizing process was started at 11:20 at 65° F., live steam being admitted to jacket of vat and agitator on low speed. Steam shut off at 12:07 and when temperature registered 194° F. At 12:18 when fluid registered at 180° F., cold water admitted to jacket and agitator continued on low. At 12:55 fluid at 91° F., cooling was checked. At 1:10 fluid at 90° F. inoculated with four gallons of culture of *Bacillus Bulgaricus* associated with 25% of *Para lacticus* (or other lactic acid type) to each 100 gallons of 1% milk. At 8:25 culture at 87.5° F. Sample .86% acidity. At 8:35 brine admitted with agitator on high speed breaking curd and cooling. At 8:52 fluid at 60° F., agitation and brine shut off. Bottled under 14 foot head and placed in refrigerator box at 45° F. for 12 hours to cure and cool. At 4:00 p. m. the next day sample gave .99% acidity.

A cycle of operation of third adaptation of process with skimmed milk follows very closely the cycle for the second adaptation of process, except in the checking point of fermentation which is at a slightly lower acidity varying from .75% to .84% acid. Where a para-lacticus is associated in the same fermenting step with the *Bacillus Bulgaricus*, a lower temperature, approximating 90° F., is necessary to secure satisfactory reaction from the para type. This is especially true in cultures where a percentage of butter fat is left in the fluid to be cultured. At 100° F., and higher, development of the para type is practically inhibited.

I have discovered the following points of technique encountered in efforts to produce a commercially marketable Bulgaricus cultured milk:

That if acidity materially exceeds 1.05% the whey will separate and the flavor be too sharp for American market, unless the butter fat content were higher than desirable.

That, with the type of processing vat and cooling device described and with acidity materially greater than .94%, the agitation after fermentation could not be carried much beyond the point where the cooling fluid registered 57° F., without whey separating, especially where the bottling was done under the pressure of a 14 foot head. This is due partly to aeration.

That a higher point of acidity is possible in producing a palatable drink as the percent of butter fat content is increased, but that a butter fat content very materially exceeding 1.5% produces too thick a consistency for a commercially good and marketable milk. That the best consistency for a commercial product was obtained where the butter fat content ranged between .7% to 1.2%, though these limitations may be varied to some extent. For the treatment of certain diseases and disorders, it is preferable and often essential to make a final product containing substantially no butter fat. That in taking samples for acid tests where milk is processed in large vats, that wide variances resulted from the samples, depending on how and at what point of the curd the sample was taken. I also discovered that a variance occurred between samples taken immediately before and immediately after breaking curd. And I also discovered that an increase in acidity developed for several days after manufacture where product was held at temperature varying from 42° to 46° F. For example, in a batch made July 1st, at 7:10 p. m., the external temperature recorded 80° F. and the internal temperature at 87° F. At 7:15 the sample showed an acidity of .9%. Curd was broken and cooled at 7:20. At 7:30 a sample of broken and well mixed product tested only .81% acidity. It was bottled and placed in refrigerator room at once. July 2d, a sample tested .87% acidity and July 5th a sample tested 1.05% acidity sharp. I believe the reason for such variances is that in large vats, after the curd commences to set, circulation ceases in the milk media. That in this condition the middle and internal portions of the curd holds its temperature much better than the portions nearer the surfaces and the walls of the vat, especially when the temperature in the water jacket is not well maintained. This naturally causes a wide variation in bacterial activity in the different portions of the pulp body. Where apparatus is not provided to meet this situation, care must be observed in taking samples. This can be met by care and uniformity in method of taking samples from the curd. And the acidity of fermented milk in storage for the desired number of days after processing can be controlled by checking process fermentation when a desired acidity is reached and by holding storage room below 42° F. or 40° F. I have also discovered that the flavor of Bulgarian milk is improved by curing, which is accomplished by holding in storage at a temperature below 46° F., preferably between 36° F. and 40° F., for a period of at least 12 to 24 hours after breaking and cooling curd and bottling.

I have discovered also that an acidity substantially in excess of 1.05% in Bulgarian fermentations causes rough or lumpy and a sharp taste and does not produce a palatable drink.

It will be seen that I have determined the factors control of which is necessary for the production of marketable Bulgarian milk at a low manufacturing cost, such as can be obtained by the use of open vat apparatus.

It will be understood that I do not limit myself to the details of operation set out in the description, except in so far as these are specified in the following claims.

Having thus described my invention, I claim:—

1. A milk beverage comprising Bulgarian cultures, not more than 1.05% of acidity and not more than 1.5% of butter fat, said beverage containing the entire whole milk except as to the cream portion.

2. The method of making Bulgarian milk comprising de-creaming milk, fermenting the de-creamed portion with a Bulgarian culture, and adding to the fermented portion not more than enough cream to bring up the final product to 1.5% butter fat.

3. The method of making a Bulgarian milk beverage comprising removing at least a portion of the cream, fermenting the milk with Bulgarian cultures until a curd is formed, quickly cooling and breaking the curd, then bottling under conditions minimizing aeration, and holding the bottled product at a temperature below 45° F., said steps being carried out to hold the final acidity at not more than 1.05% and to retain the entire contents of the whole milk except as to the cream.

4. The method of making Bulgarian milk comprising de-creaming the milk, fermenting the de-creamed portion with a Bulgarian culture, fermenting the cream portion with a culture having good flavor-producing characteristics, and remixing said portions.

5. The process of preparing milk of the Bulgarian type which consists in separating the cream from the milk, separately culturing the skim milk and the cream, and then mixing the two together.

6. The process of preparing milk of the Bulgarian type which consists in separating the cream from the milk, separately and differently culturing the skimmed milk and the cream, and then mixing the two.

7. The process of preparing milk of the Bulgarian type which consists in de-creaming the milk, culturing the de-creamed milk with Bulgarian bacilli, culturing the cream with streptococci lacticus, or some of the lactic acid group, as the para lacticus or diplococci lacticus, and then mixing the cultured milk and cream.

8. The process of preparing milk of the Bulgarian type which consists in de-creaming the milk, culturing the de-creamed milk with *Bacillus lacticus Bulgaricus* associated with some type of paralacticus, streptococci lacticus or diplococci lacticus at a temperature favorable to their development, preferably between 87° and 97° F., culturing the cream with flavor producing para lacticus, streptococci lacticus or diplococci lacticus, mixing the cultured milk and cream together, cooling to a temperature adjacent 55° to 65° F., then reducing the temperature to a point where further action of the bacilli is largely arrested, such as 36° to 46° F., and then holding the product for a time at this temperature.

9. The process of preparing milk of the Bulgarian type which consists in separating the milk and cream, culturing the de-creamed milk with pure cultures of *Bacillus lacticus Bulgaricus* and a bacillus of the *Para, lacticus, Streptococci lacticus* or *Diplococci lacticus* group separately culturing the cream with bacilli of the *Para lacticus, Streptococci lacticus* or diplococci group, and subsequently mixing the separately cultured milk and cream.

10. The method or process of preparing Bulgarian milk comprising fermenting the partially decreamed milk with Bulgarian cultures to an acid content not above .9%, cooling the milk quickly to at least 60° F., bottling and thereafter cooling the milk to approximately 36° F.

11. The method of preparing Bulgarian milk comprising fermenting the partially decreamed milk with Bulgarian cultures to an acid content not above .9% in an open vat with agitator, thereafter agitating the milk the minimum amount necessary to break the curd and cool the milk to at least 60° F., then bottling and cooling to 36° F.

12. The method or process of preparing Bulgarian milk comprising fermenting the partially decreamed milk with Bulgarian cultures to an acid content not above .9%, rapidly cooling the milk while breaking the curd to at least 65° Fahrenheit, bottling the milk quickly, and thereafter cooling it to at least 46° Fahrenheit and curing it at a temperature at least as low as 46° Fahrenheit.

13. The method or process of preparing Bulgarian milk comprising fermenting the milk with Bulgarian cultures at a temperature not below 87° to a point so that the ultimate acidity shall not be above 1.05%, cooling rapidly to a temperature between 55° and 65° Fahrenheit, then bottling under conditions to minimize aeration, and further cooling to between 36° to 46° Fahrenheit to inhibit further bacterial development.

14. The method of making a Bulgarian milk beverage comprising removing at least a portion of the cream, fermenting the milk with Bulgarian cultures associated with some types of *Para lacticus*, *Streptococci lacticus* or *diphlococci lacticus* until a curd is formed, quickly cooling and breaking the curd, then bottling under conditions minimizing aeration, and holding the bottled product at a temperature below 45° F., said steps being carried out to hold the final acidity at not more than 1.05%, to hold the cream at not more than 1.5%, and to retain the entire milk contents except as to the cream.

15. The process of preparing milk of the Bulgarian type which consists in separating the milk into two portions, separately and differently culturing each portion and then mixing the two.

HILLHOUSE BUEL.